United States Patent
Sfarti et al.

[11] Patent Number: 5,581,680
[45] Date of Patent: Dec. 3, 1996

[54] METHOD AND APPARATUS FOR ANTIALIASING RASTER SCANNED IMAGES

[75] Inventors: Adrian Sfarti, Sunnyvale; Gunawan Ali-Santosa, Milpitas, both of Calif.

[73] Assignee: Silicon Graphics, Inc., Mountain View, Calif.

[21] Appl. No.: 132,404

[22] Filed: Oct. 6, 1993

[51] Int. Cl.$^6$ ........................................ G06F 15/00
[52] U.S. Cl. .................................................. 395/143
[58] Field of Search ................... 395/141, 142, 395/143; 345/135, 136

[56] References Cited

U.S. PATENT DOCUMENTS

| | | | |
|---|---|---|---|
| 4,475,104 | 10/1984 | Shen | 340/729 |
| 4,698,768 | 10/1987 | Thuy et al. | 364/521 |
| 4,758,965 | 7/1988 | Liang et al. | 364/518 |
| 4,878,182 | 10/1989 | Aranda et al. | 364/518 |
| 5,073,960 | 12/1991 | Nakai et al. | 382/22 |
| 5,479,590 | 12/1995 | Lin | 395/133 |

FOREIGN PATENT DOCUMENTS 4113851  11/1991  Germany.

OTHER PUBLICATIONS

Barkans, "High Speed High Quality Antialiased Vector Generation", Computer Graphics, vol. 24, No. 4, pp. 319–322, Aug. 1990.

Wu, "An Efficient Antialiasing Technique", Computer Graphics, vol. 25, No. 4, pp. 143–147, Jul. 1991.

Foley, et al., Fundamentals Of Interactive Computer Graphics, pp. 132–142 and 432–463, Jul. 1984.

Sfarti "Antialiased Bresenham Lines for X Implementation", Computer Graphics, International, Tokyo, Jun. 26, 1992.

*Primary Examiner*—Phu K. Nguyen
*Attorney, Agent, or Firm*—Blakely, Sokoloff, Taylor & Zafman

[57] ABSTRACT

A method and apparatus for drawing at least a two pixel wide antialiased line is described in which the apparatus utilizes an interpolator, having a set up unit and an iterator unit, and a blender. The set up unit determines various parameters of the line to be drawn and selects a pair of pixels adjacent to and straddling an idealized line representing the line to be drawn. The iterator unit determines the coverages of the pair of pixels based on the parameters output by the set up unit. The blender determines the color intensity values of the pair of pixels as a function of the coverages and writes the color values into a memory. The memory is a frame buffer type memory utilized to drive a display and is split into at least four banks so that the color values of the pair of pixels can be simultaneously stored in different memory banks. The apparatus also incorporates a method for resolving accumulation error in the derivation of each pixel's position and a method for accommodating for the effect of a third intersected pixel on the line to be drawn.

21 Claims, 11 Drawing Sheets

METHOD AND APPARATUS FOR ANTIALIASING RASTER SCANNED IMAGES

FIELD OF THE INVENTION

The present invention relates generally to raster scan graphics display systems, and more particularly to a graphics display apparatus employing improved methods for antialiasing raster scanned images, such as lines.

IDENTIFICATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BRIEF DESCRIPTION OF BACKGROUND ART

Graphics workstations include at least some form of scan conversion hardware which samples points, lines and polygons to be drawn on a display. Lower cost workstations typically utilize a single infinitely small sample per pixel, thereby resulting in primitive renderings that exhibit some aliasing artifacts. A commonly used scan conversion algorithm in such low cost systems, which results in aliased lines, is the Bresenham line algorithm. This algorithm is popular because it uses only integer arithmetic. At each iteration, the Bresenham line algorithm selects between the two pixels closest to the ideal position of the line on the grid represented by the display, based on the sign of an error term "d," turning one on pixel and leaving the other pixel off. A standard implementation of this algorithm is as follows:

```
dx=ABS(x1-x2)
dy=ABS(y1-y2)
d=2dy-dx                // initial value of d for Octant 1 //
incr1=2dy
incr2=2(dy-dx)
incrx1=1
incrx2=1                // always step in x //
incry1=0
incry2=1                // conditional step in y //
For i=1 to dx Do
Begin
    If d<0 Then
        Begin           // Select pixel S below the line //
            x=x+incrx1
            y=y+incry1
            d=d+incr1
        End Else
        Begin           // Select pixel T above the line //
            x=x+incrx2
            y=y+incry2
            d=d+incr2
        End
    Write_Pixel(x,y,color)
End
```

The explanatory terms "above" and "below" are used relative to the drawing octant. For example, when in octant 2, "above" means to the right of the centerline and "below" means to the left of the centerline.

Since the Bresenham algorithm causes the resulting one pixel wide line to have jagged edges, or alias artifacts, numerous techniques have been developed to remove these artifacts, or in other words, to antialias the line. A further explanation of the Bresenham line algorithm and techniques for antialiasing such lines is provided by J. D. Foley and A. Van Dam, "Fundamentals of Interactive Computer Graphics," 1983, pp. 433–437, incorporated by reference herein.

Two of the primary techniques for line antialiasing, are area sampling and multi-point sampling. In area sampling, the fraction of each pixel that is covered by a line is computed (perhaps also using multiplication by a filter function), and the resulting fractions are blended to obtain a final pixel shading for each covered or partially covered pixel. In multi-point sampling, many point samples are taken in the region of each pixel, and these samples are integrated (again, perhaps also utilizing a weighting function) to obtain pixel shading. A more detailed explanation of modern antialiasing techniques is described by J. D. Foley and A. Van Dam in "Computer Graphics - Principles and Practice" 1990, pp. 132–142, incorporated by reference herein.

An improvement to the Bresenham algorithm is described by Adrian Sfarti in "Antialiased Bresenham Lines for X Implementation", Proceedings of the 10th International Conference of the Computer Graphics Society, CG International 1992, *Visual Computing - Integrating Computer Graphics with Computer Vision-*, Tokyo, Japan (Jun. 26, 1992), pp. 639–659, incorporated by reference herein. In Sfarti, the standard Bresenham algorithm is extended to two pixel wide lines as follows:

```
dx=ABS(x1-x2)
dy=ABS(y1-y2)
e1=dy/dk
e2=e1-1
d=2dy-dx                // initial value of d for Octant 1 //
s=e1
incr1=2dy
incr2=2(dy-dx)
incrx1=1
incrx2=1                // always step in x //
incry1=0
incry2=1                // conditional step in y //
For i=1 to dx Do
Begin
    If d<0 Then
        Begin           // Select pixel S below the line //
            x=x+incrx1
            y=y+incry1
            d=d+incr1
            s=s+e1
        End Else
        Begin           // Select pixel T above the line //
            x=x+incrx2
            y=y+incry2
            d=d+incr2
            s=s+e2
        End
    Write_Pixel(x,y,color)
End
```

In the above code, the basic Bresenham algorithm is modified by adding the term "s," where s is the vertical distance from the line to the pixel center just below it, and the term "t," which is equal to the vertical distance from the line to the pixel center just above it. The term t is a function of s, in that $t=1-s$. In this improved version of the Bresenham algorithm, $d=(s-t)*dx$. Since $s+t=1$, it follows that $s=(1+d/dx)/2$ and $t=(1-d/dx)/2$. Thus, as d varies at each iteration of the line by either incr 1 or incr2, s will vary accordingly, either by $e1=incr1/(2dx)$ or $e2=incr2/(2dx)$. This operation allows the algorithm to avoid dividing at each iteration, since the terms e1 and e2 are constant increments that can be precomputed.

Sfarti also discusses how pixel coverages are computed, how steps can be taken to compensate for the effect of certain line slopes, and how fractional endpoints are calculated so that the line to be drawn is correctly positioned. Sfarti also discusses a technique for compensating for the effect of a third pixel intersected by the line to be drawn. As noted by Sfarti, since the two-pixel wide extension can only reference two pixels at a time, any third pixel intersected by the line would need to be neglected in order to maintain coverage formulas for the other intersected pixels. Although Sfarti discusses an attempt to compensate for neglecting the effect of the third pixel, this attempt was merely that, and does not accurately approximate the effect of the third pixel.

As discussed above, many antialiasing techniques employ filter functions. However, attempts to use hardware to incrementally compute a filter function while rendering tends to require the use of a simple filter function because better filters are too computationally expensive. Line antialiasing methods based on box postfiltering are also computationally expensive and do not produce a pixel coverage that is useful for an implementation of an alpha-buffer. An alternative approach is to pre-compute a set of filter values and store them in a look-up table, a technique described by the Gupta-Sproull algorithm (which requires integer arithmetic), and more specifically described by A. C. Barkans in "High Speed High Quality Antialiased Vector Generation", ACM Computer Graphics, Volume 24, Number 4, August 1990, incorporated herein by reference, which is directed to the use of a precomputed filter function in combination with the Bresenham algorithm.

Sfarti also describes the application of a filtering function to provide additional improvements in pixel coverage computation. Accordingly, the application of a circular cone filter 10 about the line 12, as illustrated in FIG. 1 against the grid 14, has the advantages of being rotationally symmetric and of providing for pixel coverage computation at each iteration. Unfortunately, such a filter is also computationally expensive because it requires three multiplications per iteration. As discussed by Sfarti, the advantages of this filter can be obtained, however, without its disadvantages, by precomputing the filter function and utilizing the s value in conjunction with the error term d as an index to an integral lookup table that contains the computed pixel coverages.

The distance s, as shown in FIG. 1, is used for computing pixel coverage since the convolution integral is a function of the orthogonal distance s*cosa. The computation of s therefore mimics the incremental computation of the Bresenham error term d. Since pixel coverage is a function of the distance between the center of the pixel and the line to be drawn, then d=s*cosa for 0<s<1. Thus, a lookup table that is indexed with s can be used to compute d.

Sfarti also indicates that error terms introduced in the improved algorithm allow for lines to be drawn with very high precision (25 bits). Although the precision of the improved algorithm would appear to be sufficient to render a reasonably accurate line, since the magnitude of s is carefully calculated, subsequent analysis of this algorithm reveals that this is not always the case. In situations where s varies between a negative and positive number, crossing through zero on various occasions, the value of s can be inaccurate enough, even at 25 bits of precision, so as to cause the sign of s to be incorrect. In such instances, pixels can be drawn on the wrong side of a line, thereby causing an artifact. In addition, if this occurred numerous times during the drawing of one line, the line would take on a twisted appearance because of the various line crossings.

It should also be noted that problems have arisen when attempts have been made to apply such line drawing and antialiasing techniques to polygonal images. The most significant of these problems relates to the accurate sampling of pixels inside the polygonal image.

Each of the aforementioned implementations of line drawing and antialiasing procedures, as well as other such procedures of which applicants are aware, do not address (1) computing pixel positions with sufficient precision to accommodate error accumulation, or (2) calculating antialiased lines while accounting for the effect of more than two pixels on that line.

One object of the invention is to improve prior implementations of line drawing procedures.

Mother object of the invention is to accommodate for the effect of three intersected pixels in each iteration of a line drawing procedure.

A further object of the invention is to improve the accuracy of line drawing procedures.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations particularly pointed out in the appended claims.

BRIEF SUMMARY OF THE INVENTION

A preferred embodiment of the present invention comprises a method and apparatus for drawing at least a two pixel wide antialiased line. The apparatus comprises an interpolator, having a set up unit and an iterator unit, and a blender. The set up unit determines various parameters of the line to be drawn and selects a pair of pixels adjacent to and straddling an idealized line representing the line to be dram. The iterator unit determines the coverages of the pair of pixels based on the parameters output by the set up unit. The blender determines the color intensity values of the pair of pixels as a function of the coverages and writes the color values into a memory. The memory is a frame buffer type memory utilized to drive a display and is split into at least four banks so that the color values of the pair of pixel can be simultaneously stored in different memory banks. The apparatus also incorporates a method for resolving accumulation error in the derivation of each pixel's position and a method for accommodating for the effect of a third intersected pixel on the line to be drawn.

DETAILED DESCRIPTION OF PREFERRED EMBODIMENT

Figure 1:
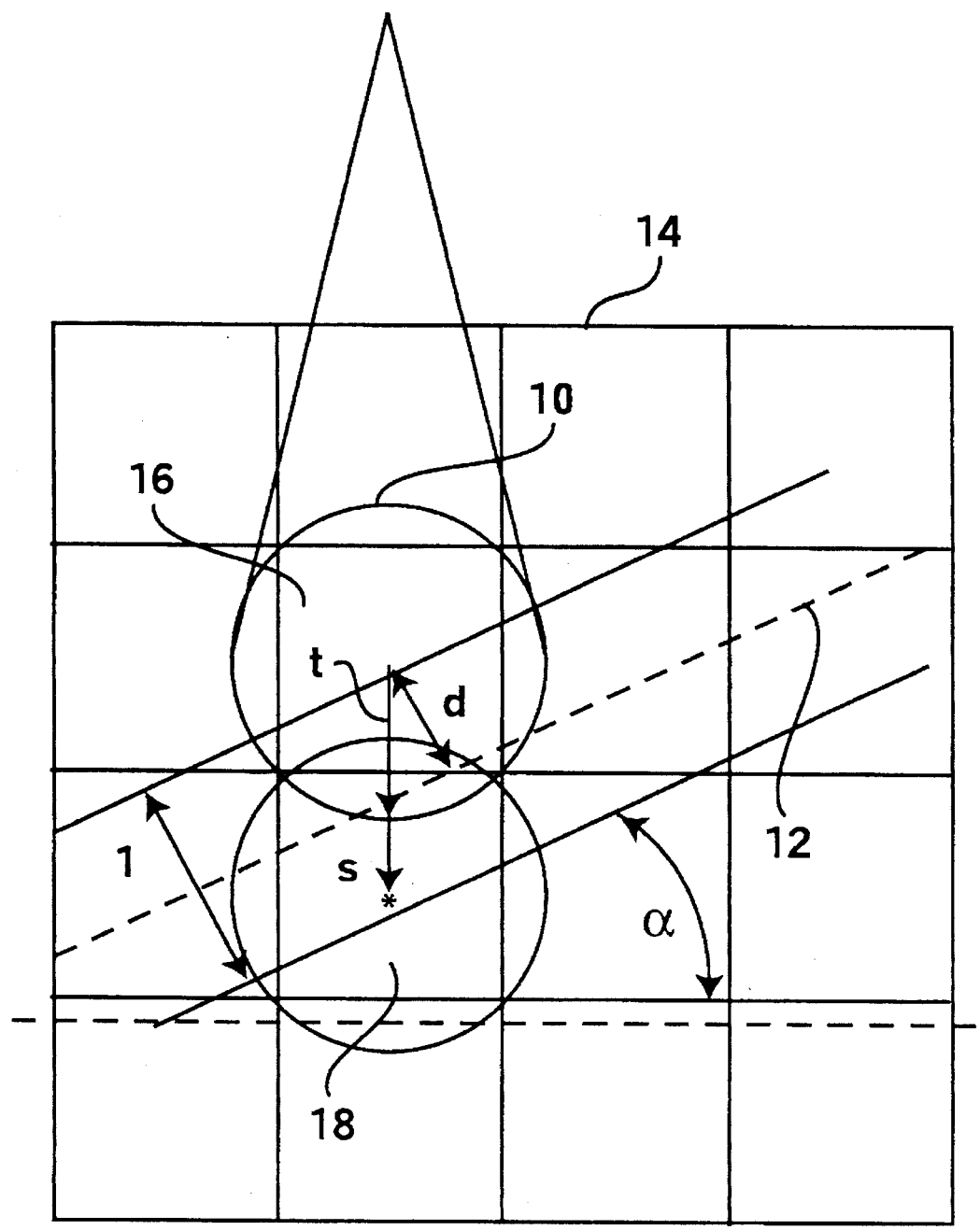
FIG. 1 is an illustration demonstrating how a circular cone filter is applied to a line projected against a grid of pixels.

In the discussion of the background art above, a two-pixel wide line drawing process was described as an improved implementation of the basic Bresenham process. In accordance with Sfarti, it was indicated that it was not necessary to accurately accommodating for the effect of a third intersected pixel on the line to be drawn. It has been found, however, that projected lines can be rendered more correctly in accordance with the three pixel wide line drawing process of the present invention. By drawing a three pixel wide line, the effect of a third intersected pixel can be accurately factored into the rendered line.

A process, in accordance with the preferred embodiment of the present invention, for drawing a three pixel wide line is described as follows:

Select a first pixel closest to an idealized line between the start point and the end point of the line;

select a second pixel adjacent to the first pixel, such that the first pixel and the second pixel form a pair of pixels straddling the idealized line;

select a third pixel adjacent to the first pixel, such that the second pixel and the third pixel frame the first pixel so as to form a line of pixels;

determine a first coverage for the first pixel as a function of a value of a distance between the idealized line and the first pixel (First_Coverage =s=(1+d/dx)/2)

determine a second coverage for the second pixel as a function of a value of a distance between the idealized line and the second pixel (Second_Coverage =t=(1−d/dx)/2);

determine a third coverage for the third pixel as a function of a value of a distance between the idealized line and the third pixel (Third_Coverage =min(t+1, s+1);

determine an intensity for the line of pixels as a function of the first coverage, the second coverage, and the third coverage;

write color values into a frame buffer memory for the line of pixels based on the intensity of the line of pixels;

output the color values for the line of pixels to a display; and repeat the above steps until color values for each of a plurality of adjacent lines of pixels between the start point and the end point have been output to the display.

Having now described a novel implementation of a three-pixel wide line drawing process, it is important to note that the value of s, in any of the above processes, is affected by the precision of computing the slope of the line and error accumulation which can result during the computation of pixel coverage. While the computation of a pixel's position is always exact, the computation of a pixel's coverage is subject to error accumulation.

A pixel's position is exact because coordinates are represented in the 16.4 format (sixteen bits of integer, plus four bits of fraction), and the terms dy and dx are represented exactly in the 17.4 format (as a result of doubling the coordinate range). Thus, the computation of each pixel's position is an exclusive function of the error terms d and sdx (as discussed below), which are always exact and which use the 18.8 format. The computation of a pixel's coverage is not exact because it is a function of s. Since the initial value of the term s is dependent on the slope e1, and since e1 is a floating point number derived from the division dy/dx, s is not exact. In addition, the subsequent values of s are determined by adding e1 or e1−1. Thus, s is the only value in the described processes that is subjected to error accumulation. As previously noted, in some instances, an inaccuracy in the calculation of the value of s can result in s being close to the correct magnitude, but still of the wrong sign.

In the present invention, s is computed with four bits of precision. Since the accumulated error in this computation is restricted to being no larger than $2^{(-5)}$ over the X drawing range (i.e. $2^{16}$), the error in computing e1 is restricted to satisfy the condition:

$$\text{error\_e1} < 2^{21}$$

This results in 21 bits of precision for computing e1, which is well within the range of most hardware dividers.

It should be noted, however, that while the value of a pixel's coverage is dependent only on the magnitude of s, the position of the bottom, or "S", pixel is dependent on both the sign and magnitude of s. To therefore alleviate problems which can be caused by an error in the sign of s, the term sdx is utilized in the following disclosure to accommodate for error accumulation. So as to not obfuscate the invention, application of this term is applied to a two pixel wide line. Since error accumulation can occur when computing both two and three pixel-wide lines, however, this solution is equally effective when applied to the three pixel wide process described above.

As discussed, to accommodate for instances where the calculation of s results in s having the wrong sign, the variable sdx=s*2dx is calculated. The sign of this variable can be used to determine the position of the second pixel of the pair of pixels which straddle the line. In accordance with this technique, even though s is still calculated precisely, any error in the value of s is less significant because the sign of s is no longer the sole determining factor with respect to pixel placement.

An application of the variable sdx, for a two-pixel wide line, a presently preferred embodiment of the present invention, is illustrated in the following example:

```
Begin {main}
e1=dy·dx
d=2dy−dx
incr1=2dy
incr2=2(dy−dx)
s=e1
sdx=e1 * 2dx=incr1
For i=1 to dx Do
Begin
   If d<0 Then
   Begin
      x=x+incrx1
      y=y+incry1
      d=d+incr1
      s=s+e1
      sdx=sdx+incr1
```

```
        End Else
        Begin
            x=x+incrx2
            y=y+incry2
            d=d+incr2
            s=s+e2
            sdx=sdx+incr2
        END
        If sdx>0 Then
        Begin
            Coverage_T=aa_table(s)
            Write_Pixel(x,y+1,Coverage_T)
            Coverage_S=aa_table(1-s)
            Write_Pixel(x,y,Coverage_S)
        End Else
        Begin
            Coverage_T=aa_table(1-s)
            Write_Pixel(x,y,Coverage_T)
            Coverage_S=aa_table(s)
            Write_Pixel(x,y-1,Coverage_S)
        End
    End {main}
```

As is illustrated in FIG. 1, with respect to the above process, the coverages of the top pixel (T) 16 and the bottom pixel (S) 18 are functions of the respective distances s and 1-s. As shown above, the tables, "aa_table(s)" and "aa_table(1-s)" contain the coverages of the two pixels S and T, respectively, expressed as a function of the respective distances s and 1-s. In the preferred embodiment of the present invention, circular cone filters are also utilized, due to their advantage of providing overall computational symmetry, to compose the lookup tables. Due to the symmetry of these filters, the total number of necessary tables is equal to one table per octant, which in the preferred embodiment includes a total of eight tables, all of which can be loaded within a single instruction cycle.

Since the actual coverages of the two pixels in these tables are functions of the orthogonal distances (s*cosa), these tables must be reloaded every time a new line is to be redrawn. It should be noted, however, that in practice, reloading these tables does not result in an undue burden because the width of the line varies rather coarsely with the angle of the line and the lookup table needs to be reloaded every time the angle a or the width of the line 12 changes anyway. Also, neither reload operation will present a system bottleneck if the data path and the lookup table are of the same size.

When the present invention is implemented in a preferred computer system, such as an Indy™ workstation manufactured by Silicon Graphics, Inc., of Mountain View, Calif., s can be calculated with even less precision than discussed by Sfarti without ill effects. Since the data path of the Indy workstation is 64 bits wide, s can be computed with four bits of precision. Since each entry in the lookup tables described above is four bits wide, the lookup table has 64 bits and can therefore be reloaded in one instruction cycle.

The availability of alpha blending, which provides for opacity or translucency information on a pixel-by-pixel basis, is a desirable feature in any graphics display environment. As previously mentioned, certain filtering techniques do not produce pixel coverages that are useful for implementation of alpha blending. Since the preferred embodiment of the present invention utilizes a circular cone filter to produce pixel coverage at each iteration, the full capabilities of an alpha-buffer can be implemented. One manner for implementing such an alpha-buffer is to include the following code following the pixel selection routines described above:

```
Procedure Write_Pixel(x,y,z,alpha,rgb)
Begin
    temp=alpha * RGB+(1-alpha) * rgb_buffer
    Write (x,y,temp)              // replace the color //
End
```

This procedure executes alpha blending between the drawing of the color "RGB" and the writing of the framebuffer data "rgb_buffer."

Figure 2:
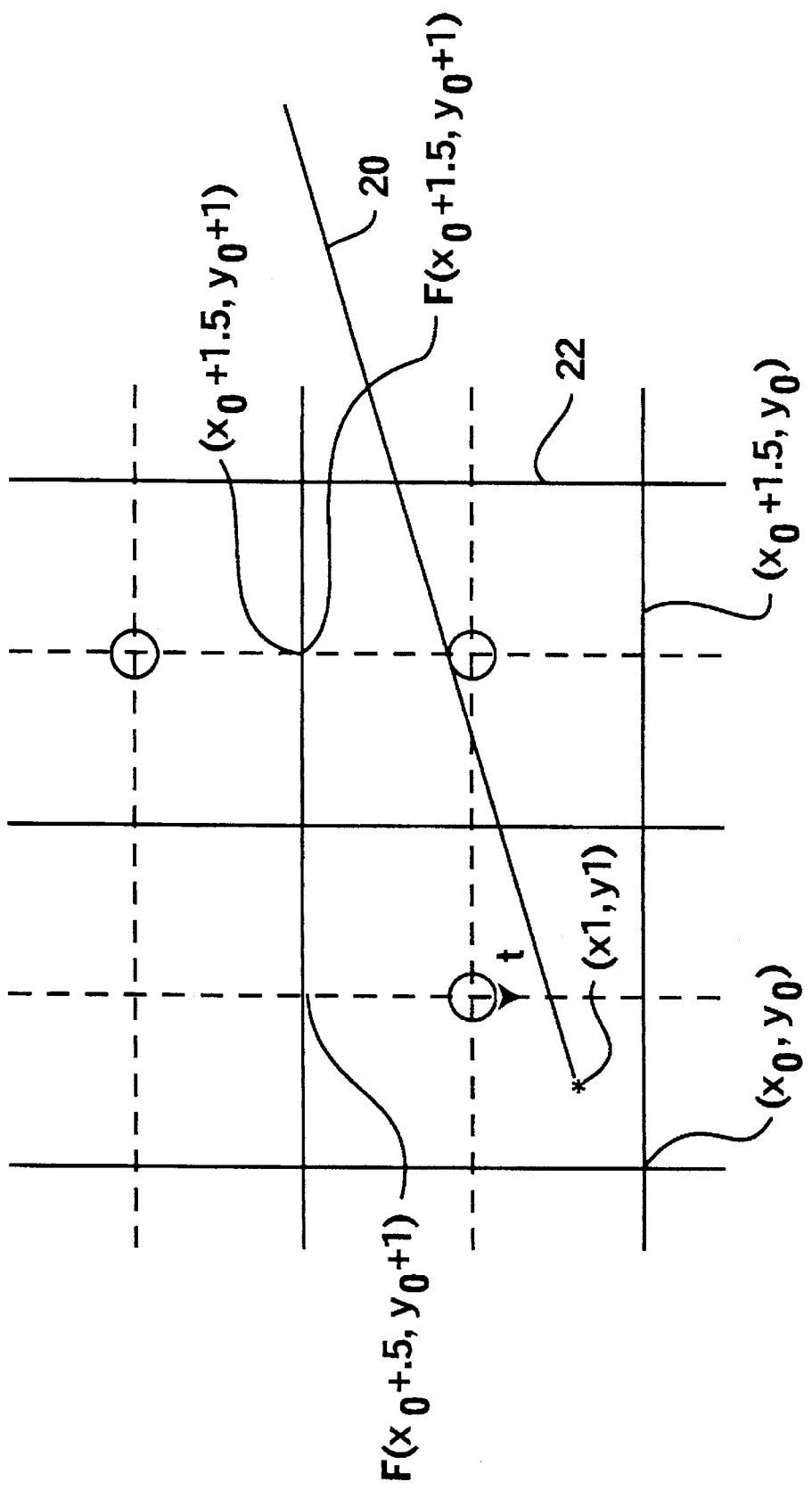
FIG. 2 is an illustration demonstrating the calculation of a starting point of a line having fractional coordinates projected against an integer grid.

An additional image enhancing technique involves adjusting d and s in order to accommodate for fractional endpoints. In the preferred embodiment, since endpoint coordinates are fractional, the initial values for d and s need to first be calculated and then adjusted, while the rest of the algorithm remains unchanged. As illustrated in FIG. 2, if the starting point of the line 20 projected against the integer grid 22 is (x1,y1), as expressed in fractional coordinates, then (x0,y0) represents the closest point on the grid 22 to that starting point, wherein x0=int(x+0.5) and y0=int(y+0.5).

The computation of the initial value of d is related to the value of the function:

$$d=2^*F(x0+0.5,y0+1)=2[a(x0+0.5)+b(y0+1)+c],$$

where a=dy, b=−dx, c=y1$^*$dx−x1$^*$dy, x0=int(x1)=x1−x1_frac, y0=int(y1)=y1−y1_frac, and where x1_frac and y1_frac are the fractional parts of x1 and y1. After substitution, the initial values of s and d for the first pixel of the line can be obtained as follows:

$$d0=dy-2dx+2(dx^*y1\_frac-dy^*x1\_frac)$$

$$s=y1\_frac-0.5+e1(0.5-x1\_frac)$$

The d value for the second pixel is dependent on the position of (x1,y1) within the starting pixel. The (x1,y1) position can be measured with the help of a newly introduced variable E, where $$E=2^*dx^*[y1\_frac+e1(1.5-x1\_frac)-2]=3dy-4dx+2(dx^*y1\_frac-dy^*x1\_frac)$$

Figure 3:
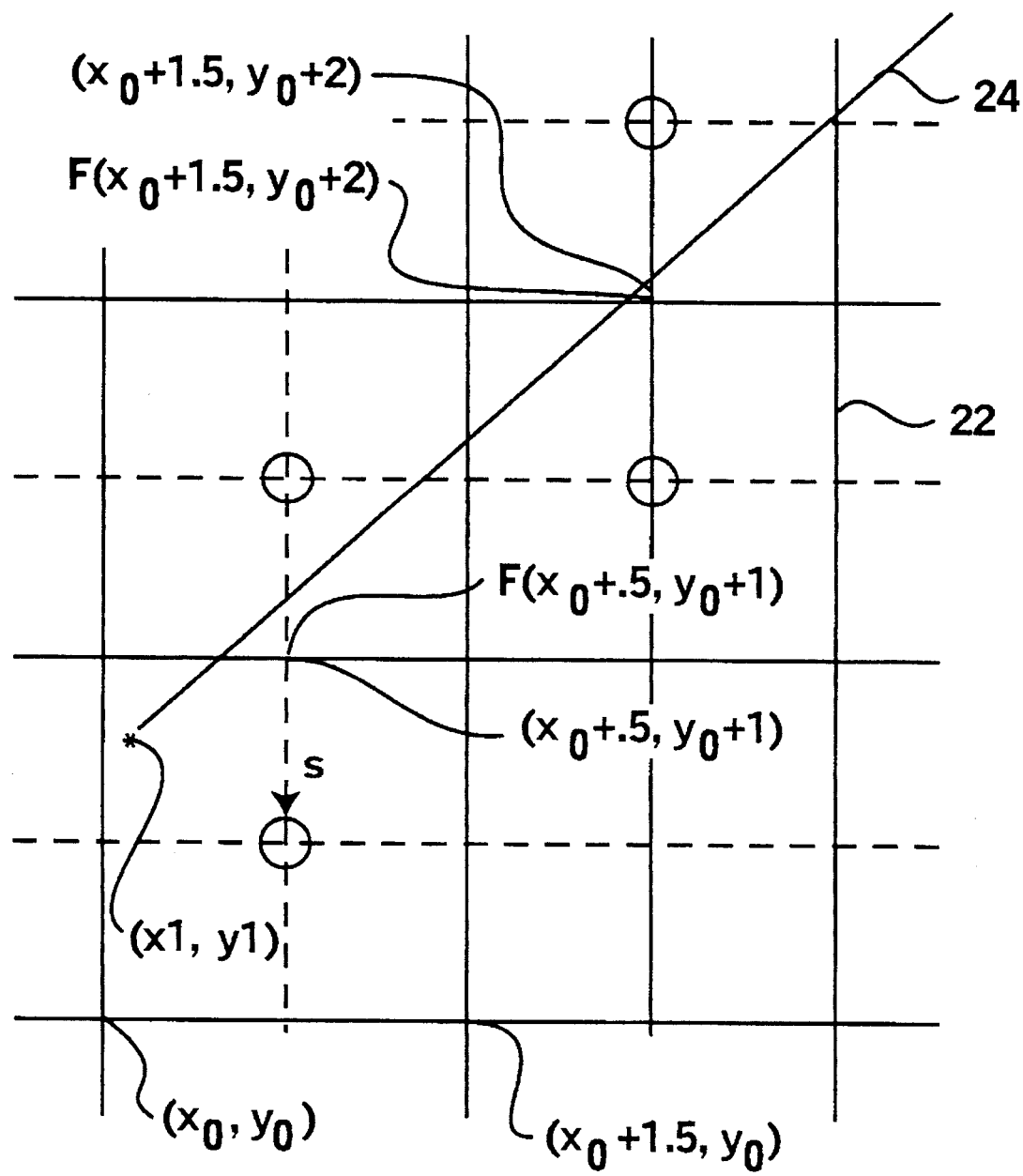
FIG. 3 is an illustration further demonstrating the calculation fractional endpoints.

Two possible scenarios for computing the next value of d are illustrated in FIGS. 2 and 3. As illustrated in FIG. 2, if E is negative, the line 20 starts at int(x1),int(y1) and the next sampling point is (x0+1.5,y0+1):

$$d1=2^*F(x,0.+1.5,y0+1)=2^*F(x0+0.5,y0+1)+2^*dy=d0+2^*dy=3dy-2dx+2(dx^*y1\_frac-dy^*x1\_frac)$$

If E is positive, as illustrated in FIG. 3, the line 24 must still start at int(x1), int(y1), otherwise connected lines will not share endpoints, and the next sampling point is (x0+1.5,y0+2):

$$d1=2^*F(x0+1.5,y0+2)=2^*F(x0+0.5,y0+1)+2^*dy-2^*dx=d0+2^*dy-2^*dx=3dy-4dx+2(dx^*y1\_frac-dy^*x1\_frac)$$

The pixel coverages for the endpoint points are functions of s and of the fractional part of the coordinates of the endpoints. This results in the computation of a triple integral, having as support the 2D domain covered by the respective endpoint. A simplified analytic formula for endpoint coverage is provided in Appendix A hereto. The state machine code for computing fractional endpoint lines with endpoint correction, and with angle compensation, is also provided in Appendix A.

Although the present invention has so far been described in terms of method steps required to carry out the various processes described above, it is to be understood that the processes of the present invention are preferably carried out in an apparatus which provides for a hardware implementation. While a general purpose processor could be utilized under software control to carry out the present invention, or a general purpose computer combined with a limited amount of hardware, more hardware is preferred over less hardware because of the greater speeds that can be achieved in a hardware implementation, and because specialized hardware flees the general purpose processor up for other purposes.

Figure 4:
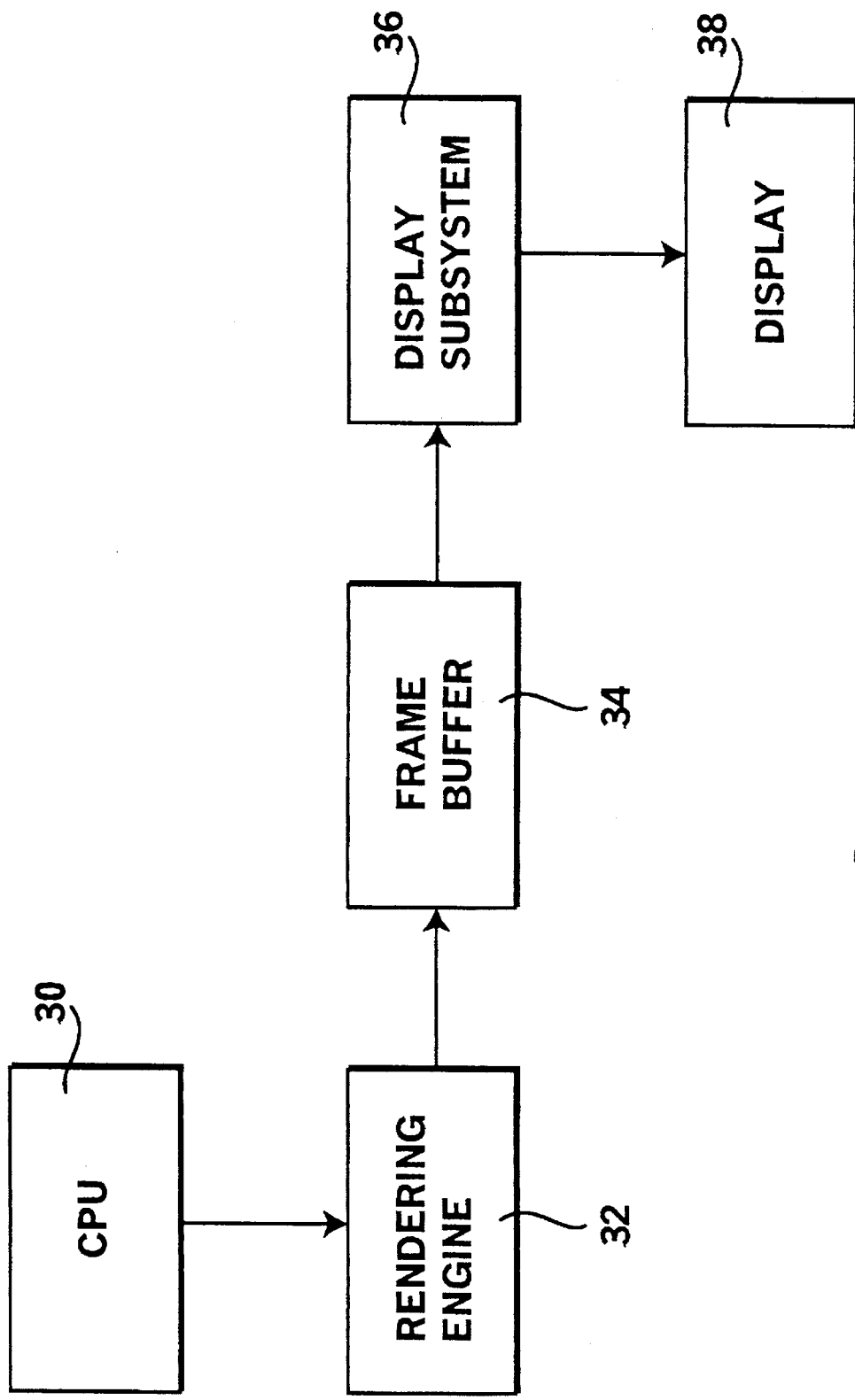
FIG. 4 is a block diagram illustrating a graphics display system for preferred implementation of the present invention.

FIG. 4 is a block diagram illustrating the general components of this apparatus, such as one of the previously described computer systems. A central processing unit (CPU) 30 is connected to a rendering engine 32, which converts geometric data processed by the CPU 30 into pixel and line data that the rendering engine then writes into the flame buffer 34. Pixel data typically includes at least X and Y screen coordinates, plus a number of parameters, such as red (R), green (G) and blue (B) color values, and alpha (A) values if alpha blending is supported. On occasion, the CPU may also output setup data, as discussed below, when a context switch occurs which causes the rendering of another image. In the present embodiment, CPU 30 outputs the X and Y screen coordinates for the start point and end point of the line to be drawn and the value "color" and "color_ delta." The frame buffer 34 is typically a VRAM (Video RAM) which contains pixel color and overlay data for the display 38, as well as clipping ID planes for use during arbitrary window clipping operations. The display subsystem 36 receives the output of the frame buffer 34 and generates RGB video signals for output to the display 38.

Figure 5:
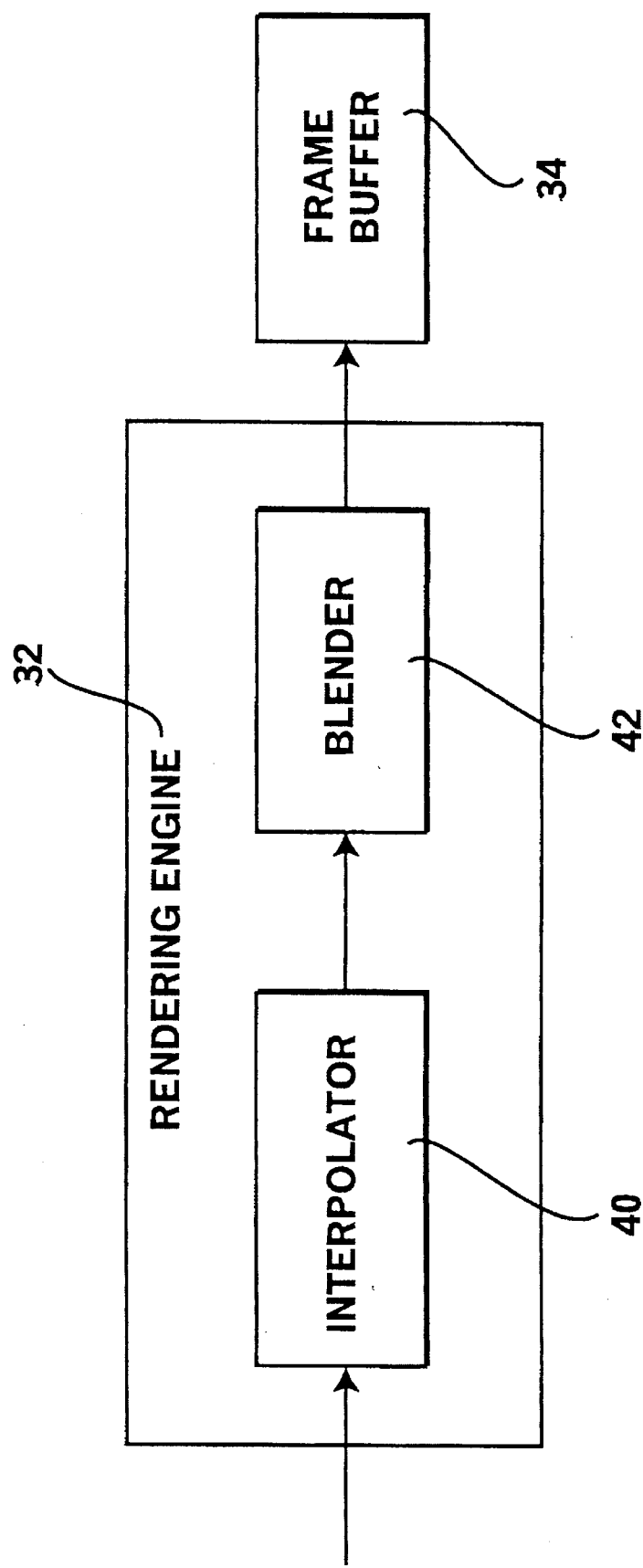
FIG. 5 is a block diagram further illustrating the rendering engine of FIG. 4.

The rendering engine 32 is further illustrated in FIG. 5 as being comprised of an interpolator 40 and a blender 42. The interpolator 40 is further illustrated in FIG. 6 as being comprised of a setup unit 44 and an iterator unit 46. The setup unit 44 receives the X and Y screen coordinates for the start point and the end point from the CPU 30. The setup unit 44 then calculates the initial setup data (parameter values), based on the X and Y coordinates and certain known characteristics of the display, for use by the iterator unit 46. The setup unit 44 is further illustrated in FIG. 7, which shows that the coordinates for the start point and end point are received by a subtracter 48, which subtracts the X and Y coordinates of the start point from the end point. The remainders (dy and dx) of the subtraction are output to the comparator 50, which compares the signs of the remainders, as well as the absolute values of the remainders, to determine the octant of the line to be drawn.

Figure 6:
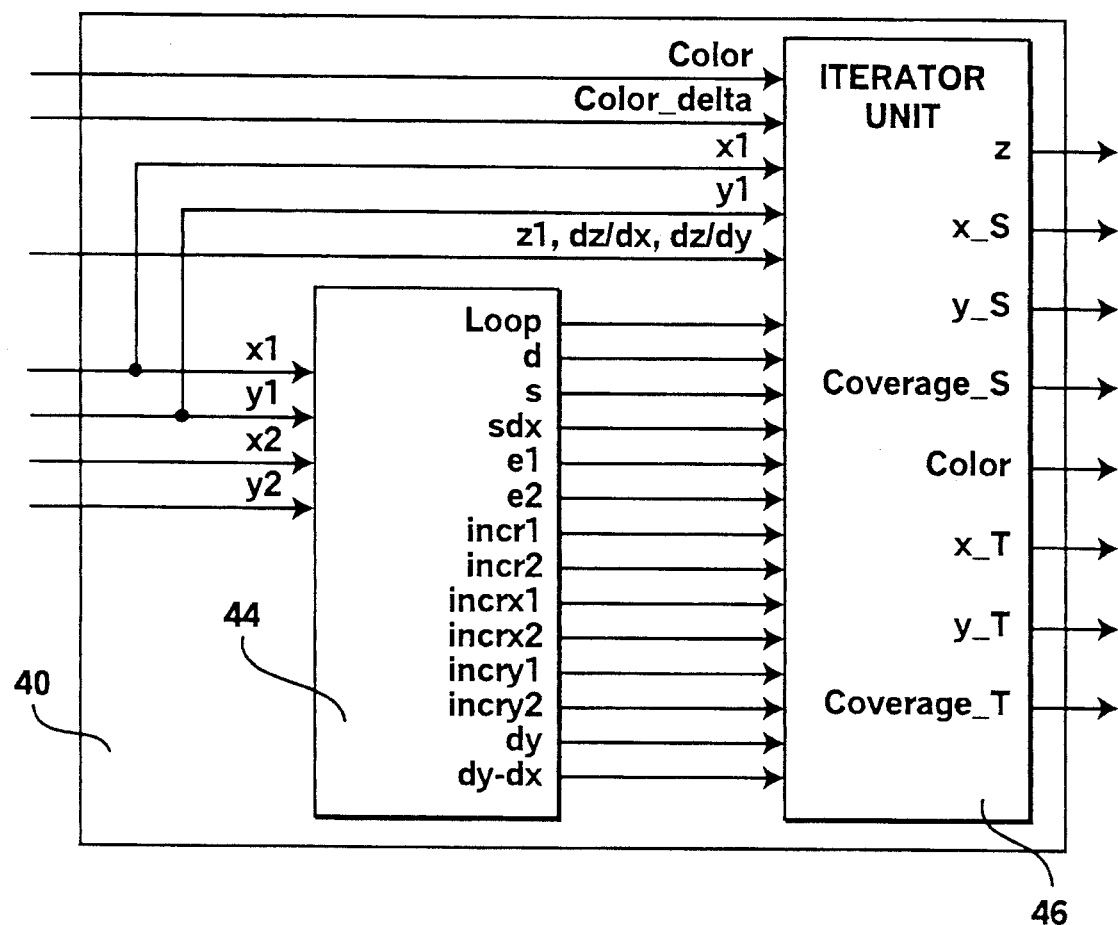
FIG. 6 is a block diagram further illustrating the interpolator of FIG. 5.
Figure 7:
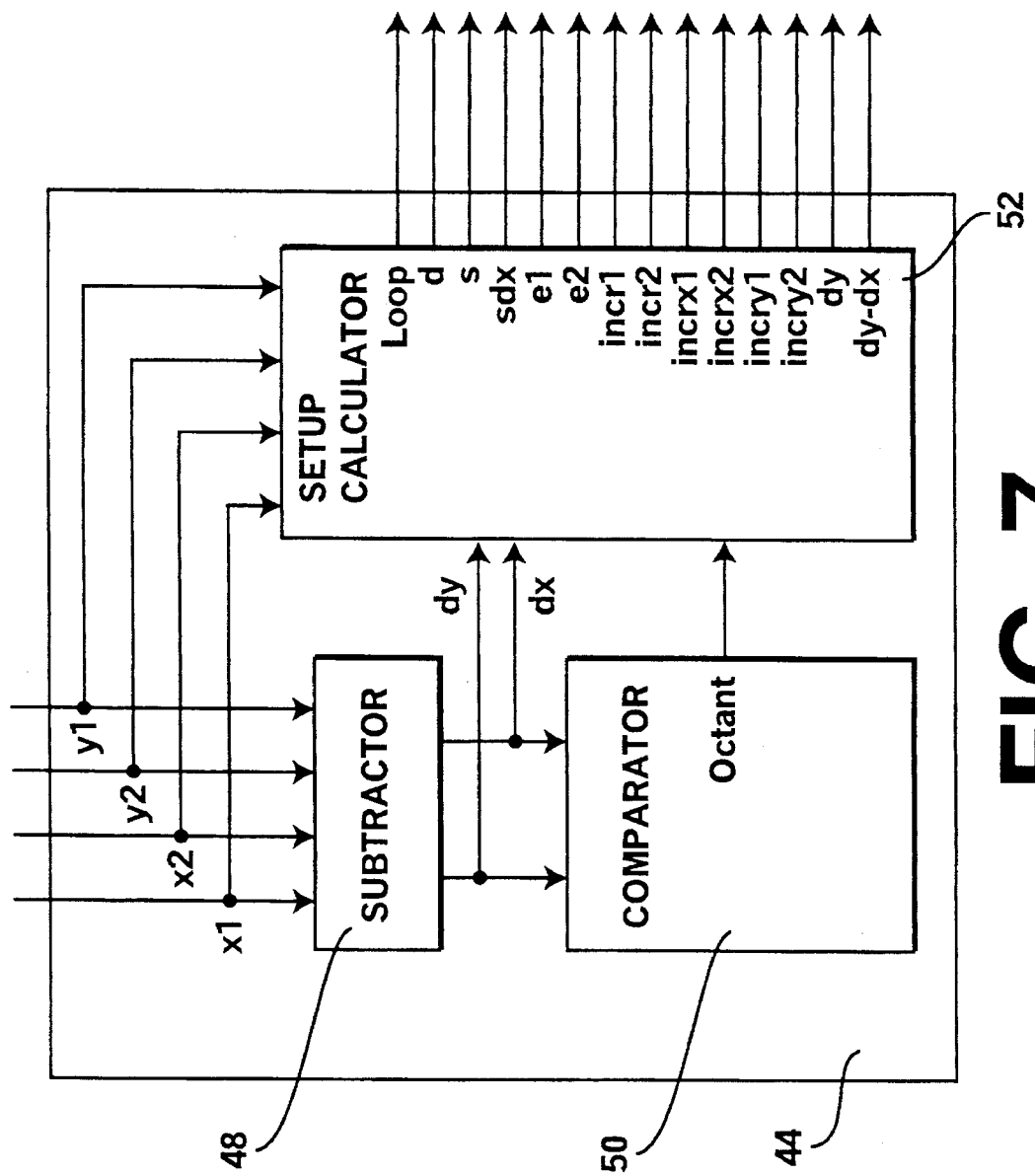
FIG. 7 is a block diagram further illustrating the setup unit of FIG. 6.
Figure 8:
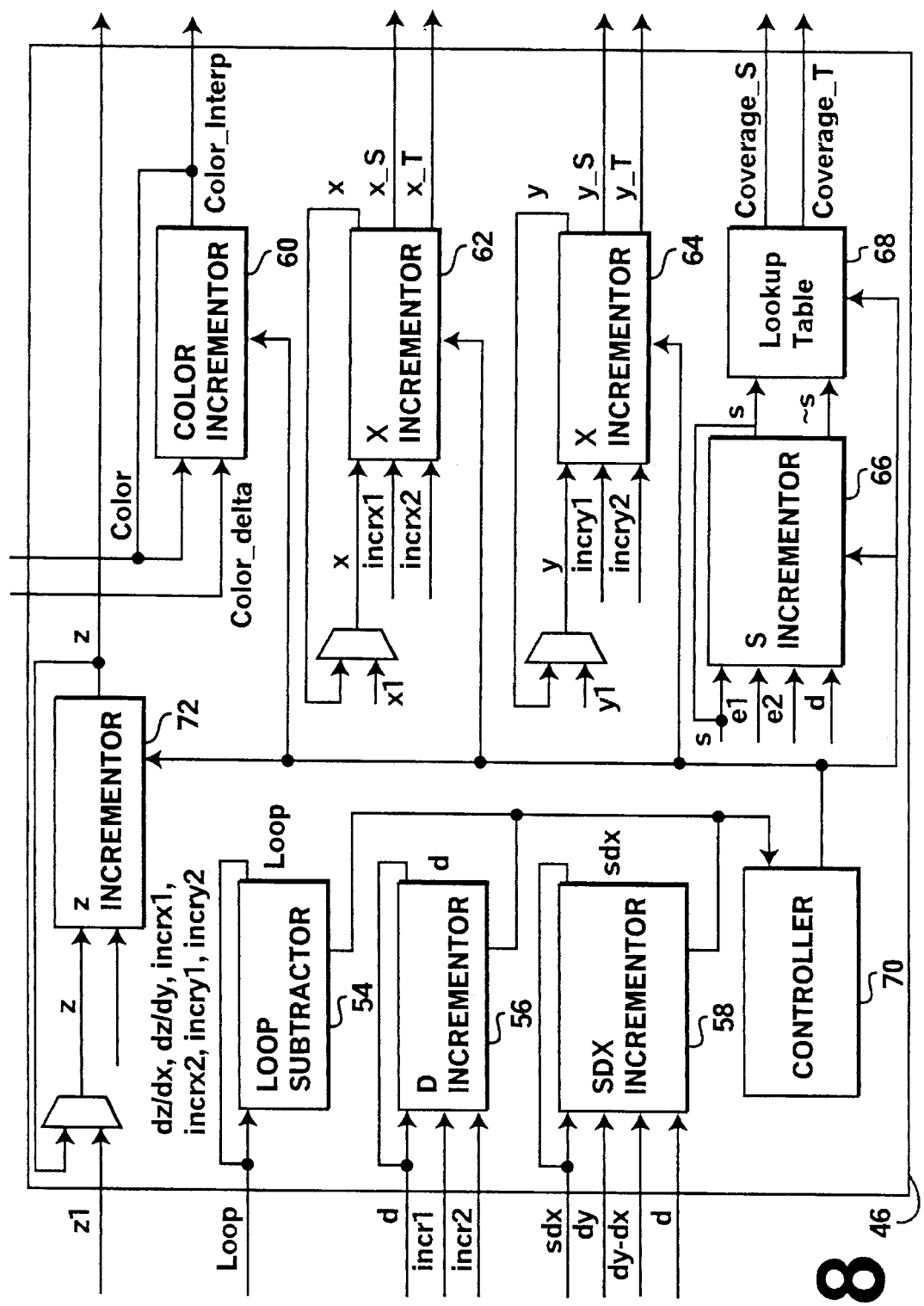
FIG. 8 is a block diagram further illustrating the iterator unit of FIG. 6.

The octant is output to the setup calculator 52, which also receives dy, dx from the subtracter 48, and the X and Y coordinates of the start point and end point. The setup calculator then computes the parameter values loop, d, s, sdx, e1, e2, incr1, incr2, incrx1, incrx2, incry1, incry2, dy and dy-dx. These parameter values are output to the iterator unit 46 of FIG. 6, which also receives the values color and color_delta from the CPU 30. The iterator unit 46 uses these inputs to compute the coordinates of the two or three pixels comprising each iteration of the line, as well as the coverages and colors of those pixels. FIGS. 6 and 8 illustrate the function and operation of the iterator unit 46 for computing a two pixel wide line in accordance with the present invention.

Figure 10:
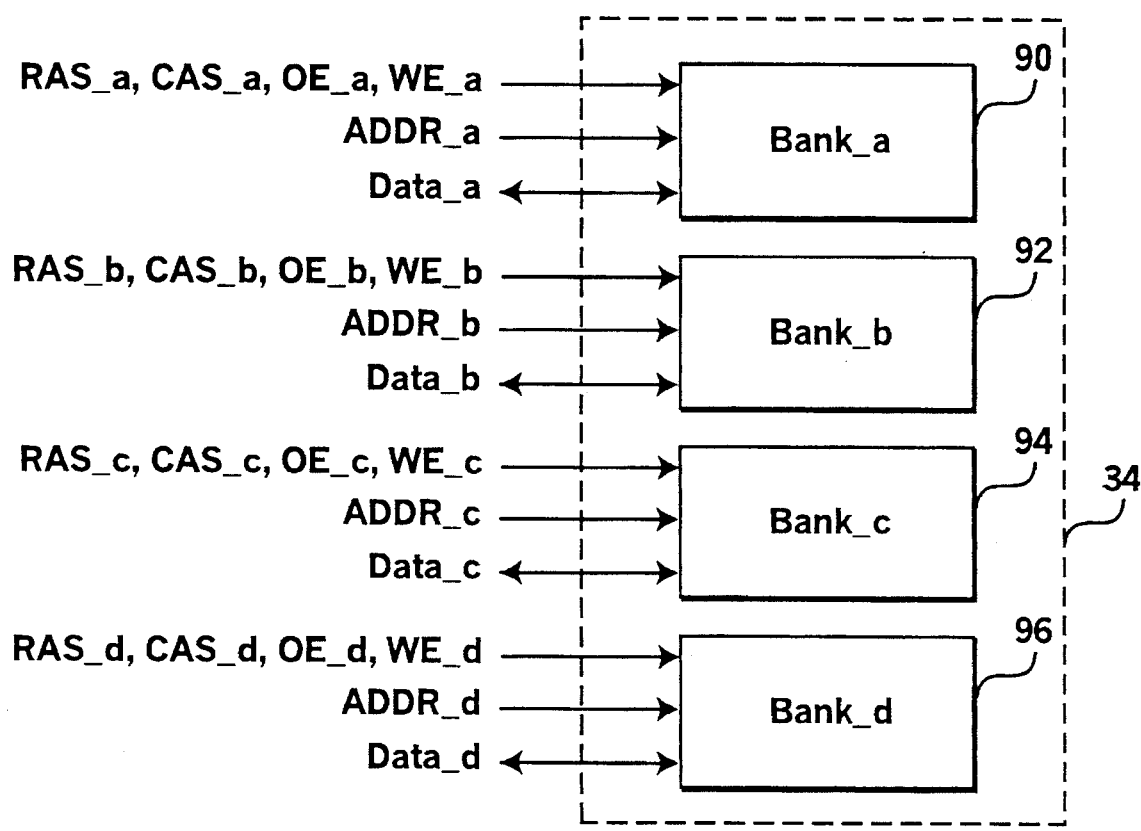
FIG. 10 is a block diagram further illustrating the frame buffer of FIGS. 4 and 5.

In FIG. 10, the iterator unit 46 is shown as being comprised of an incremental loop subtracter 54, a d incrementor 56, a sdx incrementor 58, a color incrementor 60, a X incrementor 62, a Y incrementor 64, and as incrementor 66.

A lookup table 68 is connected to the output of the s incrementor 66 for retrieval of the pixel coverages as previously discussed.

A controller 70 is also provided to receive the outputs of the loop subtracter 54, the d incrementor 56 and the sdx incrementor 58, and to use that information to control the operation of the remaining incrementors and the lookup table 68.

Figure 9:
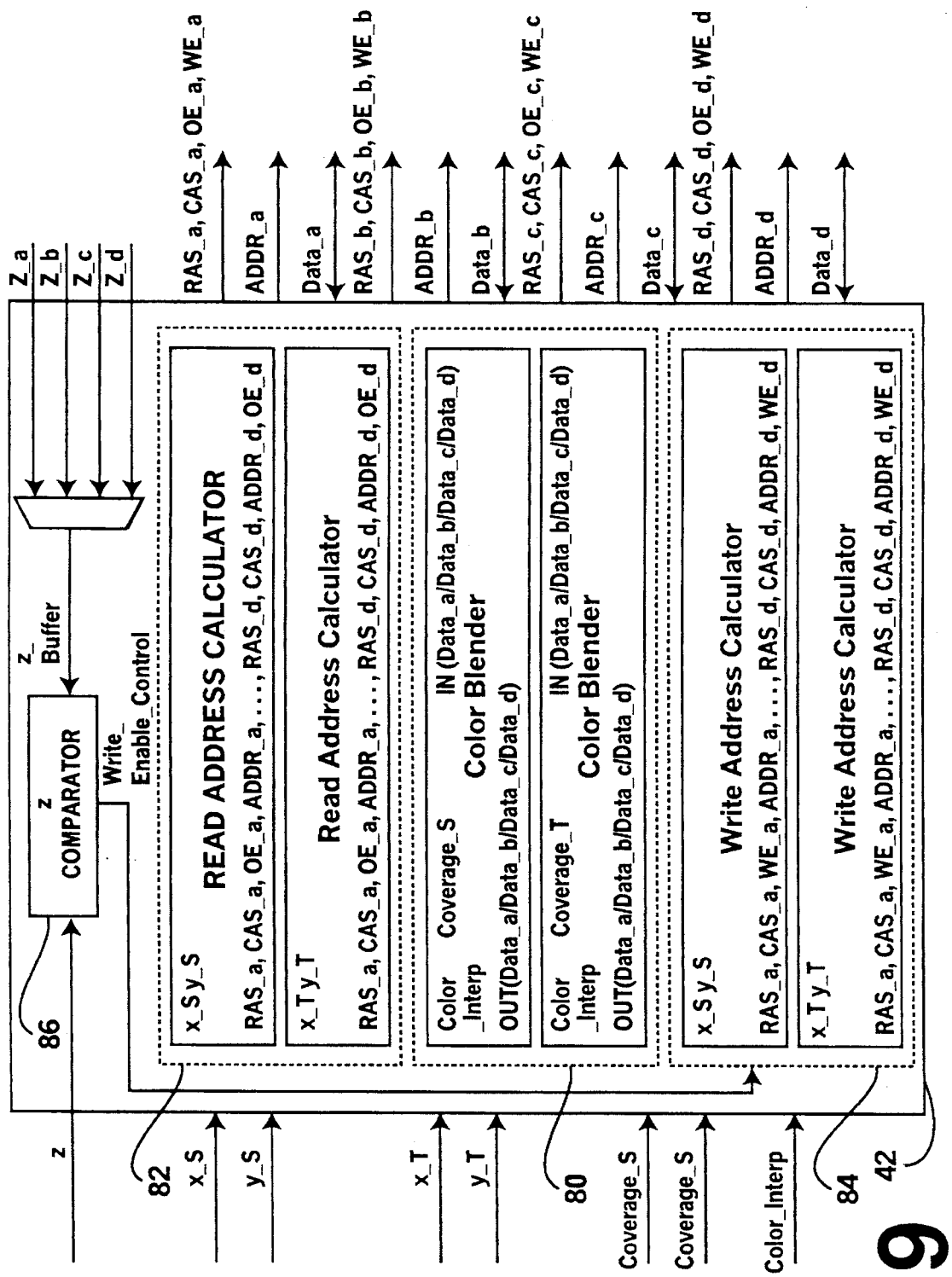
FIG. 9 is a block diagram further illustrating the blender of FIG. 5.

The output of the iterator unit 46 is then received by the blender 42, which is further illustrated in FIG. 9. The blender 42 operates to perform a number of functions. One function, when alpha blending is utilized, is to determine the color of a present pixel in view of any underlying pixel which may be allowed to leak through because of the opacity of the present pixel.

The blender 42, the operation of which is well known in the art, is particularly useful when antialiased lines are to be rendered against a background that is not black, or where one antialiased line crosses another antialiased line, because the blender 42 can make background corrections that preserve the antialiased appearance of each of the rendered lines.

The other function, which is independent of alpha blending, is to determine the row address strobe (RAS), column address strobe (CAS), output enable (OE), write enable (WE), frame buffer bank address and pixel data values for each pixel to be written into one of four or more banks of the frame buffer as a result of the above described iterative process. Since the above process computes the coverage of two to three pixels at each iteration, some mechanism must be provided for those coverage values to be written into the frame buffer simultaneously.

For the case of a two pixel wide line, both coverages are computed simultaneously through the use of the lookup table 68, by addressing the table with s and s-bar (the one's complement of s). Thus, while s is picking up the S-pixel coverage from the table, s-bar is picking up the T-pixel coverage from the same table. The two color blender units 80 of the blender 42 allow colors to be assigned to the pixels simultaneously, and the dual read address calculators 82 and write address calculators 84 allow both coverages and colors to be written into the frame buffer memory 34 simultaneously. In order to make such frame buffer write access possible, the frame buffer is split into multiple banks and subbanks amongst a multiple of semiconductor chips.

Figure 11:
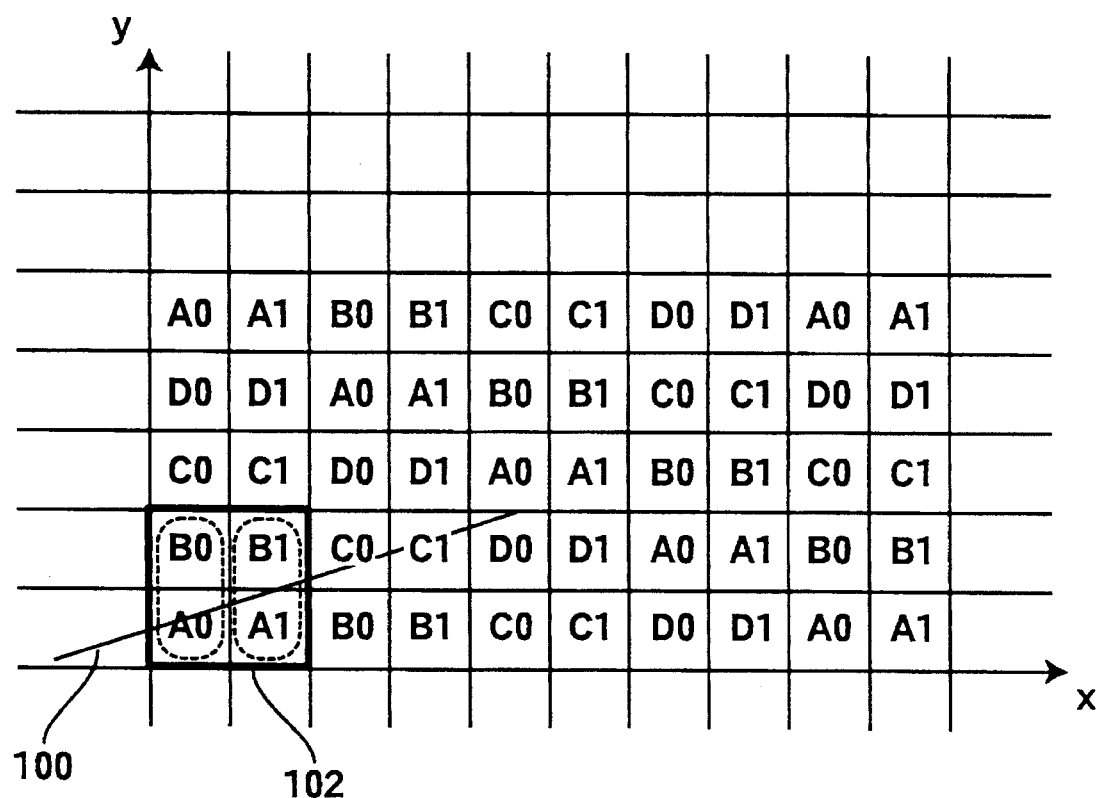
FIG. 11 is an illustration demonstrating the assignment of pixel data to various subbanks in the frame buffer of FIG. 10.

Although the frame buffer 34 could be split into any number of even number banks, in the preferred embodiment, a total of four banks are utilized. Each of these banks (A, B, C and D, as indicated in FIG. 11) is located on a separate semiconductor memory chip, where it is split into two subbanks (0 and 1). It should be noted, however, that the same chip could be used for two or more banks, provided the chip was truly multi-ported (including multiple sets of controls). The layout of the frame buffer assures that the memory bank selection scheme will always result in the two pixels selected at each iteration being written into different subbanks, regardless of the slope of the line to be drawn or the vertical or horizontal position of the pixels to be selected. For example, with respect to line 100, four different subbanks are used to write the pixels in the area 102.

A mathematical model for calculating the subbank of a pixel is next described. Although this model also portrays a physical layout for the frame buffer 34, many different hardware implementations of this basic model could be utilized. For every given X and Y value, the three least significant bits of X are extracted and the 2 least significant bits of Y are extracted. As a result, there are eight possible values of X and four possible values of Y. The possible values of Y are designated YY. A value for X, designated as XXX is then computed by taking the possible values of X and adding in binary (and ignoring the final carry bit) either a 0, 2, 4 or 6. Thus, if YY=00, add 000 to the three least significant X bits, if YY=01, add 010 to the three least significant X bits, if YY=10, add 100 to the three least significant X bits, and if YY=11, add 110 to the three least significant X bits.

For example, if Y=15 and X=23, then Y would be 1111 in binary with 11 as the two least significant bits. Likewise, X would be 10111 in binary with 111 as the three least significant bits. Since YY=11, then 110 would be added in binary to the three least significant bits of X, resulting in $$\begin{array}{r}111\\+\underline{110}\\\overline{101}\end{array}\text{ (ignoring the final carry bit)}$$

After calculating XXX, the bank can be determined by looking at the first 2 most significant bits of XXX and the subbank can be determined by looking at the least significant bit of XXX. The possible values of XXX and the corresponding banks and subbanks are therefore as follows:

| XXX | Bank | Subbank |
|-----|------|---------|
| 000 | A | 0 |
| 001 | A | 1 |
| 010 | B | 0 |
| 011 | B | 1 |
| 100 | C | 0 |
| 101 | C | 1 |
| 110 | D | 0 |
| 111 | D | 1 |

Since the iterator can iterate more than one pixel per iteration and differently controllable subbanks of the frame buffer can be used for each of the pixels making up a line at each iteration, it is possible to perform memory access at about twice the speed previously possible, given that 2 pixels can be written per iteration and an iteration occurs every 60nsec.

In this disclosure, there is shown and described only the preferred embodiment of the present invention, but it is to be understood that the invention is capable of use in various other combinations and environments and is capable of changes and modifications within the scope of the inventive concept as expressed herein. In particular, while the present invention is primarily described as being implemented in hardware, this does not preclude the invention's implementation in software or some other combination of hardware and software.

Appendix A: Code for antialiased line with fractional endpoints and angle compensation, with endpoint filtering.

Procedure Write_Pixel(x,y,alpha)
// 0=< alpha<=1 due to looking it up in aa_table //
global variable: new_color
//new_color is the current drawing color//

Begin
    Read_Framebuffer(x,y,bckg_color)
        //read the background color at location (x,y)//
    color=alpha*new_color + (1-alpha)*bckg_color
        // alpha represents pixel coverage//
    Write_Framebuffer(x,y,color)
        //write back the resultant of blending to (x,y)//
End Procedure GL_AAE_Bresenham(x1,y1,x2,y2,e1,c1)

fixed: x1,y1,x2,y2,e1    //CPU computes the octant//
aray: aa_table0 (s,e1), aa_table1(1-s,e1)
    // This array is a function of slope and is//
    //indexed with s//
integer: Octant,x10,y10,x20,y20
integer: x_major    //x_major=1 in octants 1,4,5,8 //
    //e1=dy/dx for x-major. e1=dx/dy for y-major//
    //where dx=ABS(x1-x2) and dy=ABS(y1-y2)//

//Compute the octant-independent values//
e2=e1-1.0
x10=int(x1), y10=int(y1)//RASTER ENGINE computes the fixed->int and the d term//
x20=int(x2), y20=int(y2)
x=x10, y=y10
dx=ABS(x1-x2), dy=ABS(y1-y2)
dx_i=ABS(x10-x20)-1, dy_i=ABS(y10-y20)-1

Case Octant of (x2-x1,y2-y1,dx-dy):

1:    d=3dy-2dx,incr1=2dy,incr2=2(dy-dx),Loop=dx_i
    //compute the octant-dependent values//
    incrx1=1,incrx2=1,incry1=0,incry2=1,x_major=1

2:    d=3dx-2dy,incr1=2dx,incr2=2(dx-dy),Loop=dy_i
    //compute the octant-dependent values//

```
        incrx1=0,incrx2=1,incry1=1,incry2=1,x_major=0
        temp=x1_fract
        x1_fract=y1_fract
        y1_fract=temp
        temp=x2_fract
        x2_fract=y2_fract
        y2_fract=temp
        temp=dx
        dx=dy
        dy=temp 3:  d=3dx-2dy,incr1=2dx,incr2=2(dx-dy),Loop=dy_i
        //compute the octant-dependent values//
        incrx1=0,incrx2=-1,incry1=1,incry2=1,x_major=1
        temp=1-x1_fract   //use 1-x_fract left of y-axis//
        x1_fract=y1_fract
        y1_fract=temp
        temp=1-x2_fract   //use 1-x_fract left of y-axis//
        x2_fract=y2_fract
        y2_fract=temp
        temp=dx
        dx=dy
        dy=temp 4:  d=3dy-2dx,incr1=2dy,incr2=2(dy-dx),Loop=dx_i
        //compute the octant-dependent values//
        incrx1=-1,incrx2=-1,incry1=0,incry2=1,x_major=0
        x1_fract=1-x1_fract//use 1-x_fract left of y-axis//
        x2_fract=1-x2_fract 5:  d=3dy-2dx,incr1=2dy,incr2=2(dy-dx),Loop=dx_i
        //compute the octant-dependent values//
        incrx1=-1,incrx2=-1,incry1=0,incry2=-1,x_major=1
        x1_fract=1-x1_fract//use 1-x_fract left of y-axis//
        y1_fract=1-y1_fract//use 1-y_fract below of x-axis//
        x2_fract=1-x2_fract//use 1-x_fract left of y-axis//
        y2_fract=1-y2_fract//use 1-y_fract below of x-axis//

6:  d=3dx-2dy,incr1=2dx,incr2=2(dx-dy),Loop=dy_i
        //compute the octant-dependent values//
        incrx1=0,incrx2=-1,incry1=-1,incry2=-1,x_major=0
        temp=1-x1_fract
        x1_fract=1-y1_fract//use 1-y_fract below of x-axis//
        y1_fract=temp
        temp=1-x2_fract
        x2_fract=1-y2_fract//use 1-y_fract below of x-axis//
```

```
            y2_fract=temp
            temp=dx
            dx=dy
            dy=temp 7:      d=3dx-2dy,incr1=2dx,incr2=2(dx-dy),Loop=dy_i
            //compute the octant-dependent values//
            incrx1=0,incrx2=1,incry1=-1,incry2=-1,x_major=0
            temp=1-y1_fract    //use 1-y_fract below of x-axis//
            y1_fract=x1_fract
            x1_fract=temp
            temp=1-y2_fract    //use 1-y_fract below of x-axis//
            y2_fract=x2_fract
            x2_fract=temp
            temp=dx
            dx=dy
            dy=temp 8:      d=3dy-2dx,incr1=2dy,incr2=2(dy-dx),Loop=dx_i
            //compute the octant-dependent values//
            incrx1=1,incrx2=1,incry1=0,incry2=-1,x_major=1
            y1_fract=1-y1_fract//use 1-y_fract below of x-axis//
            y2_fract=1-y2_fract s=y1_frac-0.5+e1(0.5-x1_frac)       //s for the first pixel//
sdx=2*s*dx=2[(y1_frac-0.5)dx+(0.5-x1_frac)dy]=dy-dx+2(dx*y1_fract-
dy*x1_fract)
// sdx=s*2dx is an infinitely precise number calculated for the first pixel //
d=d+2(dx*y1_fract-dy*x1_fract)
//adjust d due to fractional endpoints, this is d calculated for first pixel//

If SKIPFIRST=TRUE Then
Begin
        If sdx>0 Then      //Compute the coverage for the starting pixel//
        Begin
//THIS BRANCH MAY BE EXECUTED ON THE HOST IFSKIPFIRST=TRUE/
            Coverage_T=(y1_fr-1+c1/2)(1-x1_fr)+.5*e1(1-x1_fr)**2
            //T has the smaller coverage//
            Write_Pixel(x+incrx2*~x_major,y+incry2*x_major,Coverage_T)
            Coverage_S=(1-x1_fr)*c1-Coverage_T
            //S is below the line and has the larger coverage//
            Write_Pixel(x,y,Coverage_S)
        End  Else              // sdx<0 //
        Begin
            Coverage_T=(y1_fr+c1/2)(1-x1_fr)+.5*e1(1-x1_fr)**2
            //T has the  larger coverage//
```

```
                Write_Pixel(x,y,Coverage_T)
                Coverage_S=(1-x1_fr)*c1-Coverage_T
                //S is below the line and has the larger coverage//
                Write_Pixel(x-incrx2*~x_major,y-incry2*x_major,Coverage_S)
        End
    End Else //SKIPFIRST=FALSE//
    Begin
        If sdx>0 Then     //Compute the coverage for the starting pixel//
        Begin
        // THIS CODE  EXECUTED BY RASTER ENGINE BECAUSE
SKIPFIRST=FALSE//
                Coverage_T=aa_table(s_frac*(1-x1_fr))
                //The coverages are inversely proportional with x1_fr//
                Write_Pixel(x+incrx2*~x_major,y+incry2*x_major,Coverage_T)
                Coverage_S=aa_table(~s_frac*(1-x1_fr))
                //S is below the line and has the larger coverage//
                Write_Pixel(x,y,Coverage_S)
        End Else    // sdx<0//
        Begin
                Coverage_T=aa_table(~s_frac*(1-x1_fr))
                //T has the  larger coverage//
                Write_Pixel(x,y,Coverage_T)
                Coverage_S=aa_table(s_frac*(1-x1_fr))
                //S is below the line and has the larger coverage//
                Write_Pixel(x-incrx2*~x_major,y-incry2*x_major,Coverage_S)
        End
    End
    End // SKIPFIRST //
    E=d-2dx
    If E>0 Then
    //adjust d due to fractional endpoints, this is d for second pixel//
    Begin
        d=E
    End
    For i=1 to Loop-1  Do
    Begin
        If d<0 Then       // s<t, execute a horizontal step//
        Begin
                x=x+incrx1        //advance to next pixel//
                y=y+incry1
                d=d+incr1         //compute new values for d and s//
                s=s+e1
                sdx=sdx+2dy=sdx+incr1
        End Else    // d>0 results into s>t>0, execute a 45 degree step//
        Begin              //45 degree move//
                x=x+incrx2
```

```
                y=y+incry2
                d=d+incr2         //compute new values for d and s//
                s=s+e2            // this brings s back into the interval [-1,1] //
                sdx=sdx+2(dy-dx)=sdx+incr2
        End
        If sdx>0 Then
        Begin
                Coverage_T=aa_table(s_frac)    // s_frac=Fraction(s) //
                Write_Pixel(x+incrx2*~x_major,y+incry2*x_major,Coverage_T)
                Coverage_S=aa_table(~s_frac)   //~s_frac=1-s_frac //
                Write_Pixel(x,y,Coverage_S)
        End Else
        Begin
                Coverage_T=aa_table(~s_frac)
                Write_Pixel(x,y,Coverage_T)
                Coverage_S=aa_table(s_frac)
                Write_Pixel(x-incrx2*~x_major,y-incry2*x_major,Coverage_S)
        End
End If SKIPLAST=TRUE Then
//THIS CODE MAY BE EXECUTED ON THE HOSTIF SKIPLAST=TRUE//
Begin
        If sdx>0 Then      //Compute the coverage for the ending pixel//
        Begin         //Correct the endpoint(s) if start point <> end point//
        Coverage_S=(1+c1/2-y2_fr)x2_fr+.5*e1*x2_fr**2
                //S is below and has the larger coverage//
        Write_Pixel(x,y,Coverage_S)
        Coverage_T=c1*x2fr-Coverage_S
                //T is above the line and has the smaller coverage//
        Write_Pixel(x+incrx2*~x_major,y+incry2*x_major,Coverage_T)
        End Else      //sdx<0 //
        Begin
        Coverage_S=(c1/2-y2fr)x2fr+.5*e1*x2fr**2
                //S is below and has the smaller coverage//
        Write_Pixel(x-incrx2*~x_major,y-incry2*x_major,Coverage_S)
        Coverage_T=c1*x2_fr-Coverage_S
                //T is above the line and has the larger coverage//
        Write_Pixel(x,y,Coverage_T)
        End
End Else
Begin            //For SKIPLAST=FALSE RASTER ENGINE fill the last pixel/
        If d<0 Then    // s<t, execute a horizontal step//
        Begin
        x=x+incrx1        //advance to next pixel//
        y=y+incry1
```

```
            s=s+e1
            sdx=sdx+2dy=sdx+incr1
    End Else      // d>0 results into s>t>0, execute a 45 degree step//
    Begin                      //45 degree move//
            x=x+incrx2
            y=y+incry2
            s=s+e2         // this brings s back into the interval [-1,1] //
            sdx=sdx+2(dy-dx)=sdx+incr2
    End
    If sdx>0 Then    //The coverages are directly proportional with x2_fr//
    Begin
            Coverage_T=aa_table(s_frac*x2_fr)
            Write_Pixel(x+incrx2*~x_major,y+incry2*x_major,Coverage_T)
            Coverage_S=aa_table(~s_frac*x2_fr)
            Write_Pixel(x,y,Coverage_S)
    End Else
    Begin
            Coverage_T=aa_table(~s_frac*x2_fr)
            Write_Pixel(x,y,Coverage_T)
            Coverage_S=aa_table(s_frac*x2_fr)
            Write_Pixel(x-incrx2*~x_major,y-incry2*x_major,Coverage_S)
    End
    End //SKIPLAST//
    End
```

We claim:

1. An apparatus for drawing a single pixel antialiased straight line by rendering two pixels nearest an idealized line, having a start point and an end point, on a display, comprising:

an interpolator having a set up unit for calculating a first absolute value (dx) of a difference between a first coordinate of the start point and a first coordinate of the end point, determining coordinates for a first pixel closest to the idealized line between the start point and the end point, calculating a Bresenham error term (d) for the first pixel, calculating a vertical distance (s) between the idealized line and a position of a pixel below the idealized line, calculating a Sfarti error term (sdx) representing a product between the vertical distance and the first absolute value, and determining coordinates for a second pixel adjacent to the first pixel closest as a function of the sing of the Sfarti error term, the first pixel and the second pixel forming a pair of pixels straddling the idealized line, and an iterator unit for determining a first coverage for the first pixel as a function of a value of a distance between the idealized line and the first pixel, and determining a second coverage for the second pixel as a function of a value of a distance between the idealized line and the second pixel;

a blender for determining final color intensity values for the pair of pixels by combining background color intensity values with foreground color intensity values to yield blended color intensity values, and writing the blended color intensity values into a memory operative to output the blended color intensity values for the pair of pixels to the display; and the iterator further being operative to increment the Bresenham error term by a first predetermined value, increment the vertical distance by a second predetermined value, incrementing the Sfarti error term by a third predetermined value, increment a first coordinate of the first pixel by a fourth predetermined value, and increment a second coordinate of the first pixel by a fifth predetermined value, the fourth and fifth predetermined values being a function of the Bresenham error term, until blended color values for a pair of pixels closest to the end point have been output by the blender.

2. The apparatus of claim 1, wherein the memory is comprised of four different memory banks residing on at least two different semiconductor chips, and wherein the blender is operative to simultaneously write color values for the pair of pixels into the memory.

3. A method drawing a single pixel antialiased straight line by rendering three pixels nearest an idealized line having a start point and an end point on a display of a computer having a memory for storing a color value for a pixel before outputting the color value to the display, comprising the steps of:

(a) selecting a first pixel closest to the idealized line between the start point and the end point;

(b) selecting a second pixel adjacent to the first pixel, the first pixel and the second pixel forming a pair of pixels straddling the idealized line;

(c) selecting a third pixel adjacent to the first pixel, the second pixel and the third pixel framing the first pixel to form a line of pixels;

(d) determining a first coverage for the first pixel as a function of a value of a distance between the idealized line and the first pixel;

(e) determining a second coverage for the second pixel as a function of a value of a distance between the idealized line and the second pixel;

(f) determining the third coverage for the third pixel as a function of a value of a distance between the idealized line and the third pixel;

(g) determining final color intensity values for the three pixels by combining the background color intensity values with foreground color intensity values to yield blended color intensity values;

(h) writing the blended color values into the memory for the line of pixels based on the intensity of the line of pixels;

(i) outputting the blended color values for the line of pixels to the display; and (j) repeating steps (a) through (i) until blended color values for each of a plurality of adjacent lines of pixels between the start point and the end point have been output to the display.

4. The method as recited in claim 3, wherein the computer further includes an alpha memory for storing the first, second and third coverages, and further including after step (i) the steps of:

reading first, second and third alpha values from the alpha memory;

combining the first, second and third alpha values with the first, second and third coverages, respectively, to form first, second and third new alpha values; and writing the first, second and third new alpha values into the alpha memory.

5. The method as recited in claim 3, wherein step (d) includes the step of determining the first coverage by locating a first entry in a look-up table of the memory indexed by the value of a distance between the idealized line and the first pixel, wherein step (e) includes the step of determining the second coverage by locating a second entry in a look-up table of the memory indexed by the value of a distance between the idealized line and the second pixel, wherein step (f) includes the step of determining the third coverage by locating a third entry in a look-up table of the memory indexed by the value of a distance between the idealized line and the third pixel, and wherein the first entry, the second entry and the third entry are functions of a slope of the idealized line and a width of the idealized line.

6. The method as recited in claim 3, wherein step (d) includes the step of determining the first coverage by locating a first entry in a look-up table of the memory indexed by a two's complement of the value of a distance between the idealized line and the first pixel, wherein step (e) includes the step of determining the second coverage by locating a second entry in a lookup table of the memory indexed by a two's complement of the value of a distance between the idealized line and the second pixel, wherein step (f) includes the step of determining the third coverage by locating a third entry in a look-up table of the memory indexed by a two's complement of the value of a distance between the idealized line and the third pixel, and wherein the first entry, the second entry and the third entry are functions of a slope of the idealized line and a width of the idealized line.

7. The method as recited in claim 3, wherein the first pixel closest to the idealized line for a first pair of pixels is a first pixel closest to the start point and wherein the first pixel closest to the idealized line for a last pair of pixels is a first pixel closest to the end point.

8. The method as recited in claim 7, wherein for the first pixel closest to the end point, step (d) includes the step of determining the first coverage by locating a first entry in a look-up table of the memory indexed by the value of a distance between the idealized line and the first pixel, step (e) includes the step of determining the second coverage by locating a second entry in a look-up table of the memory indexed by the value of a distance between the idealized line and the second pixel, step (f) includes the step of determining the third coverage by locating a third entry in a look-up table of the memory indexed by the value of a distance between the idealized line and the third pixel, wherein the first entry, the second entry, and the third entry are functions of a slope of the idealized line and a width of the idealized line, and wherein the first entry, the second entry and the third entry are multiplied by a fractional component of a first coordinate of the end point.

9. The method as recited in claim 7, wherein for the first pixel closest to the start point, step (d) includes the step of determining the first coverage by locating a first entry in a look-up table of the memory indexed by the value of a distance between the idealized line and the first pixel, step (e) includes the step of determining the second coverage by locating a second entry in a look-up table of the memory indexed by the value of a distance between the idealized line and the second pixel, step (f) includes the step of determining the third coverage by locating a third entry in a look-up table of the memory indexed by the value of a distance between the idealized line and the third pixel, wherein the first entry, the second entry, and the third entry are functions of a slope of the idealized line and a width of the idealized line, and wherein the first entry, the second entry, and the third entry are multiplied by a one's complement of a fractional component of a first coordinate of the start point.

10. A method drawing a one pixel antialiased straight line by rendering two pixels nearest an idealized line having a start point and an end point on a display of a computer having a memory for storing a color value for a pixel before outputting the color value to the display, comprising the steps of:

(a) calculating a first absolute value (dx) of a difference between a first coordinate of the start point and a first coordinate of the end point;

(b) determining coordinates for a first pixel closest to the idealized line between the start point and the end point;

(c) calculating a Bresenham error (d) for the first pixel;

(d) calculating a vertical distance (s) between the idealized line and a position of a pixel below the idealized line;

(e) calculating a Sfarti error term (sdx) representing a product between the vertical distance and the first absolute value;

(f) determining coordinates for a second pixel adjacent to the first pixel closest as a function of the sign of the Sfarti error term, the first pixel and the second pixel forming a pair of pixels straddling the idealized line;

(g) determining a first coverage for the first pixel as a function of a value of a distance between the idealized line and the first pixel;

(h) determining a second coverage for the second pixel as a function of a value of a distance between the idealized line and the second pixel;

(i) determining final color intensity values for the pair of pixels by combining background color intensity values with foreground color intensity values to yield blended color intensity values;

(j) writing the blended color values into the memory for the pair of pixels based on the intensity of the pair of pixels;

(k) outputting the blended color values for the pair of pixels to the display;

(l) incrementing the Bresenham error term by a first predetermined value;

(m) incrementing the vertical distance by a second predetermined value;

(n) incrementing the Sfarti error term by a third predetermined value;

(o) incrementing a first coordinate of the first pixel by a fourth predetermined value and incrementing a second coordinate of the first pixel by a fifth predetermined value, the fourth and fifth predetermined values being a function of the Bresenham error term; and (p) repeating steps (f) through (0) until a color value for a pair of pixels closest to the end point have been output in step (j).

11. The method as recited in claim 10, wherein step (c) includes the steps of:

(c1) calculating a second absolute value (dy) of the difference between a second coordinate of the start point and a second coordinate of the end point; and (c2) dividing the second absolute value by the first absolute value.

12. The method as recited in claim 11, wherein step (e) includes the step of multiplying the second absolute value by a factor of two.

13. The method as recited in claim 10, wherein step (c) further includes the steps of:

(c1) calculating an error term for correcting the Bresenham error term when the start point has fractional coordinates, the error term representing the difference between calculating the Bresenham error term for a pixel closest to the start point having integer coordinates and calculating the Bresenham error term for a pixel closest to the start point having fractional coordinates; and (c2) replacing the Bresenham error term with the error term if the error term is positive.

14. The method as recited in claim 13, wherein step (c) includes the steps of:

(c1) calculating a second absolute value (dy) of the difference between a second coordinate of the start point and a second coordinate of the end point;

(c2) calculating a slope of the line by dividing the second absolute value by the first absolute value;

(c3) subtracting the fractional portion of the first coordinate of the start point from 0.5;

(c4) multiplying the result of step (c3) by the slope;

(c5) adding the result of step (c4) to the fractional portion of the second coordinate of the start point; and (c6) subtracting 0.5 from the result of step (c5).

15. The method as recited in claim 14, wherein step (e) includes the steps of:

(e1) calculating a cross product multiplying the second absolute value by a factor of two.

16. The method as recited in claim 10, wherein step (g) includes the step of determining the first coverage by locating a first entry in a look-up table of the memory indexed by the value of a distance between the idealized line and the first pixel, wherein step (h) includes the step of determining the second coverage by locating a second entry in a look-up table of the memory indexed by the value of a distance between the idealized line and the second pixel, and wherein the first entry and the second entry are functions of a slope of the idealized line and a width of the idealized line.

17. The method as recited in claim 10, wherein step (g) includes the step of determining the first coverage by locating a first entry in a look-up table of the memory indexed by a one's complement of the value of a distance between the idealized line and the first pixel, wherein step (h) includes the step of determining the second coverage by locating a second entry in a lookup table of the memory indexed by a one's complement of the value of a distance between the idealized line and the second pixel, and wherein the first entry and the second entry are functions of a slope of the idealized line and a width of the idealized line.

18. The method as recited in claim 10, wherein the first pixel closest to the idealized line for a first pair of pixels is a first pixel closest to the start point and wherein the first pixel closest to the idealized line for a last pair of pixels is a first pixel closest to the end point.

19. The method as recited in claim 18, wherein for the first pixel closest to the end point, step (d) includes the step of determining the first coverage by locating a first entry in a look-up table of the memory indexed by the value of a distance between the idealized line and the first pixel, step (e) includes the step of determining the second coverage by locating a second entry in a look-up table of the memory indexed by the value of a distance between the idealized line and the second pixel, step (f) includes the step of determining the third coverage by locating a third entry in a look-up table of the memory indexed by the value of a distance between the idealized line and the third pixel, wherein the first entry, the second entry, and the third entry are functions of a slope of the idealized line and a width of the idealized line, and wherein the first entry, the second entry and the third entry are multiplied by a fractional component of a first coordinate of the end point.

20. The method as recited in claim 18, wherein for the first pixel closest to the start point, step (d) includes the step of determining the first coverage by locating a first entry in a look-up table of the memory indexed by the value of a distance between the idealized line and the first pixel, step (e) includes the step of determining the second coverage by locating a second entry in a look-up table of the memory indexed by the value of a distance between the idealized line and the second pixel, step (f) includes the step of determining the third coverage by locating a third entry in a look-up table of the memory indexed by the value of a distance between the idealized line and the third pixel, wherein the first entry, the second entry, and the third entry are functions of a slope of the idealized line and a width of the idealized line, and wherein the first entry, the second entry, and the third entry are multiplied by a one's complement of a fractional component of a first coordinate of the start point.

21. An apparatus for drawing a single pixel antialiased straight line by rendering two pixels nearest an idealized line on a display, said apparatus comprising:

an interpolator having a set up unit for determining parameters of a line to be drawn and for selecting a pair of pixels adjacent to and straddling the idealized line and an iterator for determining coverages of the pair of pixels based on the parameters determined by the set up unit;

a blender for determining final color intensity values for the pair of pixels by blending background and foreground color intensity values; and a frame buffer memory for receiving the color values from said blender, said frame buffer memory having at least four banks and being configured to receive color values for a pair of pixels simultaneously in two or more of the four memory banks.

* * * * *